(12) United States Patent
Kosta

(10) Patent No.: US 9,070,242 B2
(45) Date of Patent: Jun. 30, 2015

(54) TECHNIQUES FOR CONTROLLING GAME EVENT INFLUENCE AND/OR OUTCOME IN MULTI-PLAYER GAMING ENVIRONMENTS

(75) Inventor: James Peter Kosta, Gardnerville, NV (US)

(73) Assignee: Digital Creations, LLC, Gardnerville, NV (US)

( * ) Notice: Subject to any disclaimer, the term of this patent is extended or adjusted under 35 U.S.C. 154(b) by 0 days.

(21) Appl. No.: 13/535,349

(22) Filed: Jun. 27, 2012

(65) Prior Publication Data

US 2013/0005482 A1 Jan. 3, 2013

Related U.S. Application Data

(60) Provisional application No. 61/504,141, filed on Jul. 1, 2011.

(51) Int. Cl.
| | | |
|---|---|---|
| *A63F 9/24* | (2006.01) | |
| *G07F 9/02* | (2006.01) | |
| *G07F 17/32* | (2006.01) | |

(52) U.S. Cl.
CPC ............ *G07F 9/023* (2013.01); *G07F 17/3206* (2013.01)

(58) Field of Classification Search
USPC ........................................................ 463/1, 42
See application file for complete search history.

(56) References Cited

U.S. PATENT DOCUMENTS

| | | | |
|---|---|---|---|
| 8,210,934 B2 * | 7/2012 | Ocko et al. ........................ 463/25 |
| 8,292,743 B1 * | 10/2012 | Etter et al. ........................ 463/42 |
| 8,303,415 B2 * | 11/2012 | Craine et al. ..................... 463/42 |
| 8,347,322 B1 * | 1/2013 | Brown et al. .................. 719/328 |
| 8,355,955 B1 * | 1/2013 | Mirchandani et al. ........ 705/26.1 |
| 8,496,532 B1 * | 7/2013 | Bethke et al. ..................... 463/42 |
| 8,556,719 B1 * | 10/2013 | Mahajan et al. ................. 463/36 |
| 2005/0216550 A1 * | 9/2005 | Paseman et al. .............. 709/202 |
| 2008/0248845 A1 | 10/2008 | Morgan et al. |

(Continued)

FOREIGN PATENT DOCUMENTS

| | | |
|---|---|---|
| KR | 10-2003-0074020 A | 9/2003 |
| KR | 10-0743216 B1 | 7/2007 |

OTHER PUBLICATIONS

"FarmVille Guide: FarmVille Tutorial," written by Rabu, published on or before Jun. 29, 2011, retrieved from URL <http://samdd23-farmville.blogspot.com/2011/06/farmville-tutorial.html>, 7 pages.*

(Continued)

*Primary Examiner* — William Brewster
*Assistant Examiner* — Jason Skaarup
(74) *Attorney, Agent, or Firm* — Dean E. Wolf, Esq.

(57) ABSTRACT

Various aspects described or referenced herein are directed to different methods, systems, and computer program products for facilitating and/or enabling user controllable granularity in multi-player gaming environments for enabling a user (e.g., Target Player) to selectively allow/prevent game event influence/outcome by other players and/or groups of players participating in a multi-player game. At least a portion of the game event influence/outcome techniques disclosed herein may be operable to provide event influence/outcome functionality for facilitating user controllable granularity in multi-player gaming environments for enabling individual players of that game to granularly and selectively control the degree and/or type of influence other players of the game may have on game event outcomes relating to the game being played by that individual player.

24 Claims, 8 Drawing Sheets

| | Player A | Player B | Player C | Player D | Player E |
|---|---|---|---|---|---|
| Player A | Influence Pos + Neg | | | | |
| Player B | Influence Pos + Neg | Influence Pos + Neg | | | |
| Player C | Only influence POS | Influence Pos + Neg | Influence Pos + Neg | | |
| Player D | NO INFLUENCE | Only influence POS | NO INFLUENCE | Influence Pos + Neg | |
| Player E | Influence Pos + Neg | Only influence POS | NO INFLUENCE | NO INFLUENCE | Influence Pos + Neg |

(56) References Cited

U.S. PATENT DOCUMENTS

| | | | | |
|---|---|---|---|---|
| 2009/0210491 | A1 | 8/2009 | Thakkar et al. | |
| 2011/0212769 | A1* | 9/2011 | Carroll et al. | 463/29 |
| 2011/0300926 | A1* | 12/2011 | Englman et al. | 463/25 |
| 2012/0015740 | A1* | 1/2012 | Vanbragt et al. | 463/42 |
| 2012/0015741 | A1* | 1/2012 | Craine et al. | 463/42 |
| 2012/0108320 | A1* | 5/2012 | Ye et al. | 463/25 |
| 2012/0122590 | A1* | 5/2012 | Nguyen | 463/42 |
| 2012/0142429 | A1* | 6/2012 | Muller | 463/42 |
| 2012/0184363 | A1* | 7/2012 | Barclay et al. | 463/25 |
| 2012/0220377 | A1* | 8/2012 | Cantor | 463/42 |
| 2012/0225723 | A1* | 9/2012 | Webster et al. | 463/42 |
| 2012/0244948 | A1* | 9/2012 | Dhillon et al. | 463/42 |
| 2012/0277003 | A1* | 11/2012 | Eliovits et al. | 463/42 |
| 2013/0005466 | A1* | 1/2013 | Mahajan et al. | 463/36 |
| 2013/0005473 | A1* | 1/2013 | Bethke et al. | 463/42 |

OTHER PUBLICATIONS

"Find friends and connect on Xbox Live," written by Microsoft, and retrieved from URL <http://support.xbox.com/en-US/apps/twitter/chat-managing-friends>, 2 pages.*

"Zynga Poker: Texas Hold 'em," written by IGN, published on or before Jan. 29, 2010, retrieved from URL <http://pc.gamespy.com/web-games/zynga-poker/guide/>, 2 pages.*

"How-To: Requests—Facebook Developers," written by Facebook, and retrieved from URL <https://developers.facebook.com/docs/howtos/requests/>, 5 pages.*

"Games Tutorial—Facebook Developers" written by Facebook, and retrieved from URL <http://developers.facebook.com/docs/guides/games/>, 8 pages.*

"How-To: Multi-Friend Selector—Facebook Developers," written by Facebook, and retrieved from URL <http://developers.facebook.com/docs/howtos/multi-friend-selector/>, 4 pages.*

"Real ID—Battle.net Support," written by Blizzard Software, and retrieved from URL <https://us.battle.net/support/en/article/real-id#q3>, 4 pages.*

PCT International Search Report, PCT Application No. PCT/US2012/044485, International Filing Date Jun. 27, 2012, Search report mailed Jan. 31, 2013.

* cited by examiner

Fig. 7 — 700

|  | Player A | Player B | Player C | Player D | Player E |
|---|---|---|---|---|---|
| Player A | SELF* | | | | |
| Player B | FRIEND* | SELF* | | | |
| Player C | FOF | FRIEND* | SELF* | | |
| Player D | Stranger | FOF* | Stranger | SELF* | |
| Player E | FRIEND* | FOF | Stranger | Stranger | SELF* |

Column refs: 702, 704, 706, 708, 710
Row refs: 701, 703, 705, 707, 709

Fig. 8 — 800

| Relationship Type | Influence Rules/Criteria |
|---|---|
| Self | Influence Pos + Neg |
| Friend | Influence Pos + Neg |
| Friend of Friend (FOF) | Only influence POS |
| Stranger | NO INFLUENCE |

801 — Relationship Type column
803 — Influence Rules/Criteria column
Row refs: 801 (Self), 803 (Friend), 805 (FOF), 807 (Stranger)

Fig. 9 — 900

|  | Player A | Player B | Player C | Player D | Player E |
|---|---|---|---|---|---|
| Player A | Influence Pos + Neg | | | | |
| Player B | Influence Pos + Neg | Influence Pos + Neg | | | |
| Player C | Only influence POS | Influence Pos + Neg | Influence Pos + Neg | | |
| Player D | NO INFLUENCE | Only influence POS | NO INFLUENCE | Influence Pos + Neg | |
| Player E | Influence Pos + Neg | Only influence POS | NO INFLUENCE | NO INFLUENCE | Influence Pos + Neg |

Column refs: 902, 904, 906, 908, 910
Row refs: 901, 903, 905, 907, 909

TECHNIQUES FOR CONTROLLING GAME EVENT INFLUENCE AND/OR OUTCOME IN MULTI-PLAYER GAMING ENVIRONMENTS

RELATED APPLICATION DATA

The present application claims benefit, pursuant to the provisions of 35 U.S.C. §119, of U.S. Provisional Application Ser. No. 61/504,141, titled "USER BEHAVIOR, SIMULATION AND GAMING TECHNIQUES", naming Kosta et al. as inventors, and filed 1 Jul. 2011, the entirety of which is incorporated herein by reference for all purposes.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2010-2012, Dean E. Wolf, All Rights Reserved.

BACKGROUND

The present disclosure relates to multi-player gaming environments. More particularly, the present disclosure relates to techniques for controlling game event influence and/or outcome in multi-player gaming environments.

BRIEF DESCRIPTION OF THE DRAWINGS

FIGS. 7-9 provide examples game event influence/outcome data (and related data records) which may be used for facilitating, enabling; initiating, and/or performing one or more game event influence/outcome operation(s), action(s), and/or feature(s) described and/or referenced herein.

DETAILED DESCRIPTION OF EXAMPLE EMBODIMENTS

Overview

Figure 1:
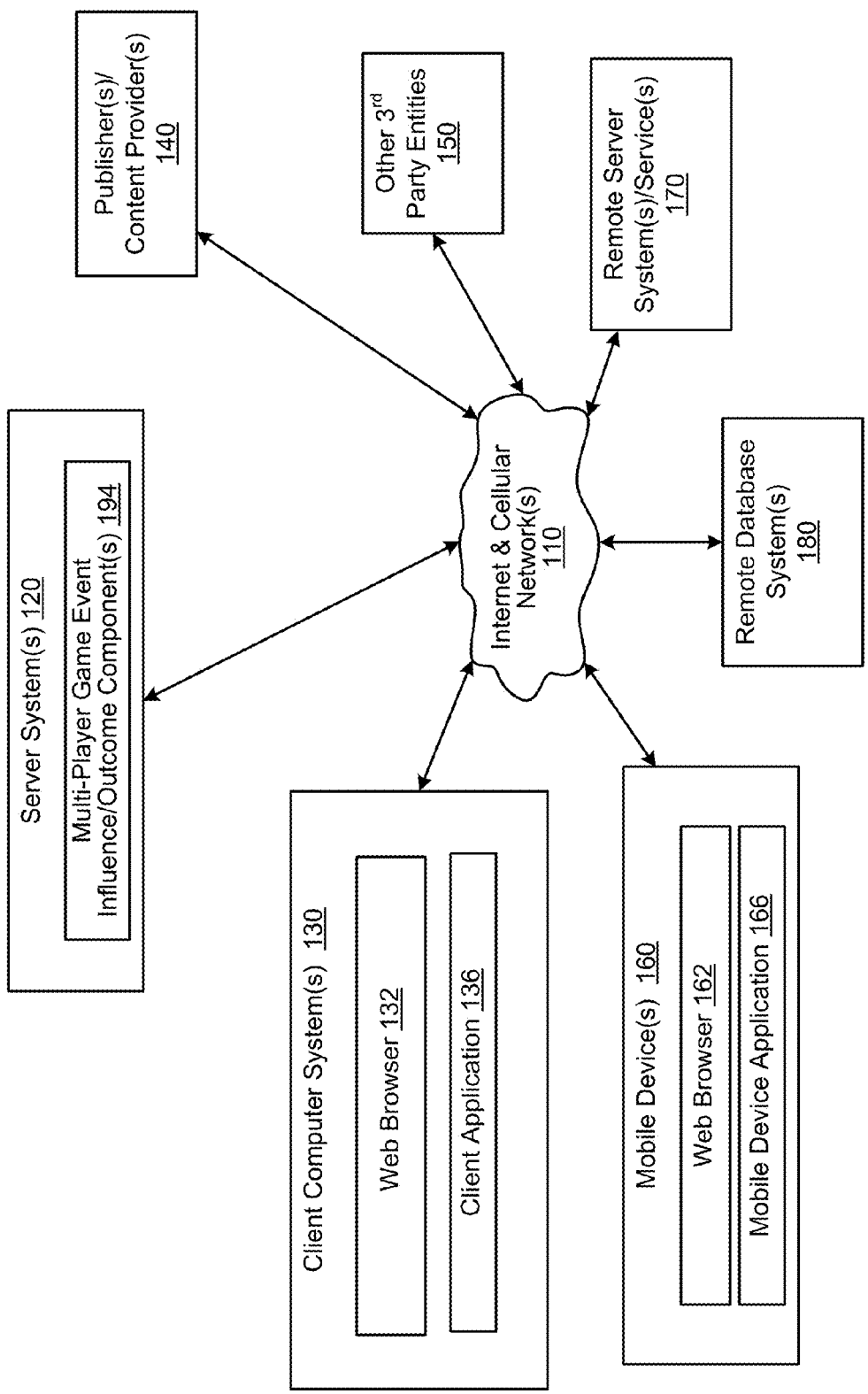
FIG. 1 illustrates a simplified block diagram of a specific example embodiment of a portion of a Computer Network 100.

Various aspects described or referenced herein are directed to different methods, systems, and computer program products for facilitating and/or enabling user controllable granularity in multi-player gaming environments for enabling a user (e.g., Target Player) to selectively allow/prevent game event influence/outcome by other players and/or groups of players participating in a multi-player game. At least a portion of the game event influence/outcome techniques disclosed herein may be operable to provide event influence/outcome functionality for facilitating user controllable granularity in multi-player gaming environments for enabling individual players of that game to granularly and selectively control the degree and/or type of influence other players of the game may have on game event outcomes relating to the game being played by that individual player.

A first aspect is directed to different methods, systems, and computer program products for operating a gaming system. According to different embodiments, the gaming system may be operable to facilitate, enable, initiate, and/or perform one or more of the following operation(s), action(s), and/or feature(s) (or combinations thereof): enable a first player to participate in a first gaming session which is controlled by the gaming system; enable the first player to selectively customize a level or degree of influence that a first group of selected other players has over outcomes of a first set of game-related events and activities relating to the first gaming session; enable the first player to selectively identify the first group of selected other players; enable the first player to selectively identify the first set of game-related events and activities; enable the first player to selectively customize a level or degree of influence that a second group of selected other players has over outcomes of a second set of game-related events and activities relating to the first gaming session; enable the first player to selectively customize a level or degree of influence that a first group of selected other players has over outcomes of a first set of game-related events and activities relating to the first gaming session by designating that the first group of selected other players is permitted to influence the outcomes of the first set of game-related events and activities relating to the first gaming session; enable the first player to selectively customize a level or degree of influence that a first group of selected other players has over outcomes of a first set of game-related events and activities relating to the first gaming session by designating that the first group of selected other players is permitted to only influence the outcomes of the first set of game-related events and activities relating to the first gaming session; enable the first player to selectively define at least a portion of the first set of game-related events and activities; enable the first player to selectively customize a level or degree of influence that a first group of selected other players has over outcomes of a first set of game-related events and activities relating to the first gaming session by designating that the first group of selected other players is not permitted to influence the outcomes of the first set of game-related events and activities relating to the first gaming session; enable the first player to selectively customize a level or degree of influence that a first group of selected other players has over outcomes of a first set of game-related events and activities relating to the first gaming session by designating that the first group of selected other players is only permitted to positively influence the outcomes of the first set of game-related events and activities relating to the first gaming session; enable the first player to selectively customize a level or degree of influence that a first group of selected other players has over outcomes of a first set of game-related events and activities relating to the first gaming session by designating that the first group of selected other players is prohibited from negatively influencing the outcomes of the first set of game-related events and activities relating to the first gaming session; enable the first player to selectively customize a level or degree of influence that a first group of selected other players has over outcomes of a first set of game-related events and activities relating to the first gaming session by designating that the first group of selected other players is only permitted to negatively influence the outcomes of the first set of game-related events and activities relating to the first gaming session.

In at least one embodiment, the groups of selected other players may be selected from various different sets of groups, such as, for example, one or more of the following (or combinations thereof): a group comprising friends of the first player; a group comprising friends of friends of the first player (FOF); a group comprising friends of FOF; a group comprising strangers; a group comprising at least one other player identified by the first player; a group comprising at least one other player which match specific selection criteria.

In at least one embodiment, sets of game-related events and activities may be selected from one or more different sets of groups, such as, for example, one or more of the following (or combinations thereof): events or activities relating to the awarding of and/or loss of game points; events or activities relating to the awarding of and/or loss of game-related life/health points; events or activities relating to the awarding of and/or loss of game-related bonuses; events or activities relating to the awarding of and/or loss of real and/or virtual currency; events or activities relating to the awarding of, loss of, and/or possession of game-related virtual objects; events or activities relating to the awarding of and/or loss of game-related rank and/or status; events or activities relating to the awarding of, loss of, and/or possession of game-related virtual real estate; events or activities relating to the reconfiguration, improvement and/or alteration of game-related characters, object, assets or real-estate; events or activities relating to the awarding of, loss of, possession of, and/or access to game-related character attributes; events or activities relating to the awarding of, loss of, possession of, and/or access to specialized game-related powers or abilities.

A second aspect is directed to different methods, systems, and computer program products for operating a gaming system. According to different embodiments, the gaming system may be operable to facilitate, enable, initiate, and/or perform one or more of the following operation(s), action(s), and/or feature(s) (or combinations thereof): identify a first player participating in a first gaming session relating to a multiplayer game; detect a first game-related event affecting the first player's gaming session for which a plurality of outcomes is possible; identify the first game-related event as being associated with a first set of game-related events; identify at least one other player involved in the first game-related event, including a first other player; determine a first set of player outcome influence criteria associated with the first other player, wherein the first set of player outcome influence criteria includes information relating to a level or degree of influence that the first other player has over an outcome of the first game-related event; dynamically determine, using at least a portion of the first set of player outcome influence criteria associated with the first other player, the outcome of the first game-related event; dynamically determine a first outcome of the first game-related event in response to determining that the first other player is permitted to influence the outcome of the first game-related event; dynamically determine a second outcome of the first game-related event in response to determining that the first other player is not permitted to influence the outcome of the first game-related event; identify a second other player involved in the first game-related event; determine a second set of player outcome influence criteria associated with the second other player, wherein the second set of player outcome influence criteria includes information relating to a second level or degree of influence that the second other player has over an outcome of the first game-related event; dynamically determine, using at least a portion of the second set of player outcome influence criteria associated with the second other player, that the second other player is not permitted to influence the outcome of the first game-related event; dynamically determine, using at least a portion of the first set of player outcome influence criteria associated with the first other player and using at least a portion of the second set of player outcome influence criteria associated with the second other player, the outcome of the first game-related event.

Various objects, features and advantages of the various aspects described or referenced herein will become apparent from the following descriptions of its example embodiments, which descriptions should be taken in conjunction with the accompanying drawings.

SPECIFIC EXAMPLE EMBODIMENTS

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products for facilitating user controllable granularity in multi-player gaming environments for enabling a user (herein "Target Player") to selectively allow/prevent game event influence/outcome by other players and/or groups of players participating in a multi-player game. Various examples of multi-player games and/or multi-player gaming environments may include, but are not limited to, one or more of the following (or combinations thereof):

internet-based multi-player online (MMO) games such as, for example, World of Warcraft™ (www.worldofwarcraft.com), The Sims Online™ (www.thesims.com), etc.

multi-player games accessible via consumer-type game consoles such as Microsoft XBOX™, Sony Playstation™, Nintendo WII™, etc.

multi-player wager-based games accessible via one or more casino gaming networks and/or other types of gaming networks;

and/or other types of multi-player games which may be accessible to users/players via one or more other types of systems and/or networks.

According to different embodiments, one or more multi-player type games may be configured or designed to include event influence/outcome functionality for enabling one or more of the game event influence/outcome features and/or aspects described herein. For example, in one embodiment, the MMO game World of Warcraft™ may be configured or designed to include event influence/outcome functionality for facilitating user controllable granularity in multi-player gaming environments for enabling individual players of that game (e.g., Player A) to granularly and selectively control the degree and/or type of influence other players of the game may have on game event outcomes relating to the game being played by that individual player (Player A).

For example, according to different embodiments, one or more multi-player type games may be configured or designed to include event influence/outcome functionality for facilitating, enabling; initiating, and/or performing one or more of the following operation(s), action(s), and/or feature(s) (or combinations thereof):

Functionality for enabling a user to customize properties of his/her gaming experience by allowing selected players and/or selected groups of players (e.g., friends of the user, friends of friends, etc.) to influence or affect the outcome of events which occur within the user's game play.

Functionality for enabling a user to customize properties of his/her gaming experience by NOT allowing selected players and/or selected groups of players (e.g., strangers) to influence or affect the outcome of events which occur within the user's game play.

Functionality for enabling a user to customize properties of his/her gaming experience by allowing selected players and/or selected groups of players to positively and/or negatively influence or affect the outcome of events which occur within the user's game play.

Functionality for enabling a user to customize properties of his/her gaming experience by allowing selected players and/or selected groups of players to only view game play events/activities without affecting or influencing outcomes in the user's game.

Functionality for enabling a user to customize properties of his/her gaming experience by preventing selected players and/or selected groups of players from positively and/or negatively influencing or affect the outcome of events which occur within the user's game play.

According to different embodiments, various examples of different relationship types and/or player group types which may be separately and/or selectively identified (e.g., by a user for defining one or more sets of game influence rules/criteria) may include, but are not limited to, one or more of the following (or combinations thereof):

Friends of user/player
    Friends of friends (FOF)
    Friend of FOF
    Strangers
    User defined group(s) (e.g., Family, Relatives, Classmates, etc.)
    Social group(s) (e.g., Facebook friends)
    Player's matching specific criteria (e.g., set by sponsor of game and/or Target Player)
    Player profile criteria (e.g., only want to have women 25-40 influence my game)
    Affiliation-based group(s)
    Geolocation-based group(s)
    and/or other types of groups of persons which may be defined based on one or more sets of user-defined criteria.

According to different embodiments, various examples of different types of game play influence rules/criteria (e.g., which may be selectively applied by a user towards one or more selected players/groups) may include, but are not limited to, one or more of the following (or combinations thereof):

- Allow selected player(s)/group of players to influence Target Player's game both positively and negatively
- Allow selected player(s)/group of players to only positively influence Target Player's game
- Allow selected player(s)/group of players to only negatively influence Target Player's game
- Allow selected player(s)/group of players to influence only specifically designated event(s)/activities of the Target Player's game. In at least one embodiment, at least a portion of the specifically designated event(s)/activities may be determined by the user/Target Player. Examples of such specifically designated event(s)/activities may include, but are not limited to, one or more of the following (or combinations thereof):
  - events/activities relating to the awarding of (and/or loss of) of game points;
  - events/activities relating to the awarding of (and/or loss of) of life/health points;
  - events/activities relating to the awarding of (and/or loss of) in-game bonuses;
  - events/activities relating to the awarding of (and/or loss of) real and/or virtual currency;
  - events/activities relating to the awarding of, loss of, and/or possession of in-game virtual objects (e.g., treasures, weapons, tokens, vehicles, maps, devices, etc.);
  - events/activities relating to the awarding of (and/or loss of) in-game rank and/or status;
  - events/activities relating to the awarding of, loss of, and/or possession of in-game real estate;
  - events/activities relating to the reconfiguration, improvement and/or alteration of in-game characters, object, assets or real-estate.
  - events/activities relating to the awarding of, loss of, possession of, and/or access to character attributes and/or abilities (e.g., size, strength, appearance, speed, intelligence, skills, etc.);
  - events/activities relating to the awarding of, loss of, possession of, and/or access to specialized powers and/or abilities (e.g., ability to fly, super-strength, invisibility, etc.);
- Allow selected player(s)/group of players only view gaming activities of Target Player without being allowed to influence Target Player's game.
- Allow Target Player to view/participate in game play activities with other selected player(s)/groups of player(s) without ability influence.
- Allow Target Player to view/participate in game play activities with other selected player(s)/groups of player(s) with ability to influence.
- Target Player may view other selected player(s)/groups in game although they may not influence the outcome of each other's games.
- and/or other types of influence rules/criteria which may be selectively applied by a user towards one or more selected players/groups.

In at least one embodiment, the negative influencing of game play events may include, but is not limited to events and/or activities in which the outcome is harmful to and/or detrimental to the Target Player. In at least one embodiment, the positive influencing of game play events may include, but is not limited to, events and/or activities in which the outcome is beneficial to and/or advantageous to the Target Player.

According to different embodiments, examples of different types of game play events and/or activities which user/Target Player may customize with respect to the ability for other players/groups to influence outcomes may include, but are not limited to, one or more of the following (or combinations thereof):

- competitive events (e.g., battles, matches, and/or other events in which Target Player and other player(s) are opponents, etc.);
- random events (e.g., stumbling on hidden treasures, objects, etc.);
- cooperative events (e.g., events in which Target Player and other player(s) are on same time or work cooperatively);
- turn-based or gameplay which takes place while disconnected from the game servers;
- acquisition/collection of game related objects, tokens, etc.;
- completion of tasks;
- and/or other types of game-related event(s)/activities described and/or referenced herein.

For example, in one embodiment, a user (Target Player) may choose to allow his online friends (e.g., Facebook friends) to influence the Target Player's game play events/outcomes both positively and negatively (e.g., from the perspective of Target Player). In one embodiment, the Target Player may choose to allow friends of friends (FOF) to only positively influence (but not negatively influence) the Target Player's game play events/outcomes (from the perspective of the Target Player).

In at least one embodiment, a change of friendship status (and/or change of group status/affiliation) for a given player may trigger automatic modification of that player's ability to influence outcomes in other players' games.

Example Scenarios Illustrating Game Event Influence/Outcome Aspects

Various features, benefits, and advantages of the game event influence/outcome techniques disclosed herein will now be described by way of examples with reference to FIGS. 7-10 of the drawings.

FIGS. 7-9 provide examples game event influence/outcome data (and related data records) which may be used for facilitating, enabling; initiating, and/or performing one or more game event influence/outcome operation(s), action(s), and/or feature(s) described and/or referenced herein.

In the specific example of FIGS. 7-9, it is assumed that five players (Player A-Player E) are participating in a multi-player game, and that the relationships among the various players A-E are reflected in Table 700 of FIG. 7. In at least one embodiment, a first portion of the player relationship data may be obtained and/or acquired from one or more database sources (e.g., such as, for example, Facebook user relationship databases, gaming server user databases, etc.), and a second portion of the player relationship data may be automatically and/or dynamically determined (and/or derived) using the first portion of known/existing player relationship data. In at least one embodiment, any missing relationship data between or among the identified players (e.g., in Table 700, FIG. 7) may be automatically and/or dynamically determined (e.g., by a gaming server system such as that illustrated in FIG. 6) based on known or available information describing existing relationships between/among the various players. In at least one embodiment, the dynamically determined player relationship data may be used to automatically populate at least a portion of the missing relationship data between or among the identified players.

For example, as illustrated in the example embodiment of FIG. 7, it is assumed that a first portion of the displayed relationship data indicated by an accompanying "*" (e.g., "SELF*", "FRIEND*", "FOF*", etc.) player relationship data which has been obtained and/or acquired from one or more database sources, and that a second portion of the displayed relationship data (e.g., which is not indicated by an accompanying "*") represents player relationship data which has been automatically and/or dynamically determined (and/or derived) using the first portion of known/existing player relationship data. Thus, for example, if it is known that Player A and Player B are friends, and it is also known that Player B and Player C are friends, then it can be dynamically determined that the relationship between Player A and Player C is "Friend of Friend" (FOF). In at least one embodiment, a "Stranger" relationship type may be used to characterize any other types of relationships which are not FRIEND or FOF.

FIG. 8 shows an example embodiment illustrating how a user (Target Player) may customize the level or degree of game event influence other types of players may have on outcomes of the Target Player's game. For example, as illustrated in the example embodiment of FIG. 8, it is assumed that the Target Player has specified the following player influence rules/criteria:

(803) other game players who are identified as having a "FRIEND" relationship to the Target Player may influence the Target Player's game play event outcomes both positively and negatively.

(805) other game players who are identified as having a "FOF" relationship to the Target Player may only have a positive influence the Target Player's game play event outcomes.

(807) other game players who are identified as having a "Stranger" relationship to the Target Player may not influence the Target Player's game play event outcomes either positively or negatively.

It will be appreciated that, in other embodiments (not shown), other types of game play influence rules/criteria (e.g., such as those described and/or referenced herein) may be selectively defined and applied by a given user/Target towards one or more selected players/groups.

FIG. 9 shows an example embodiment of a portion of a Player Influence Matrix 900, illustrating (in this particular example) the level or degree of influence that each Player B-Player E may have over the outcomes of Player A's (Target Player) game play events/activities. In the specific example embodiment of FIG. 9, it is assumed that the player influence rules/criteria defined in the Player Influence Matrix 900, was generated and/or determined using the Player Relationship Information (e.g., of FIG. 7) and the Player Relationship-Influence rules (e.g., of FIG. 8).

Thus, for example, as illustrated in the example embodiment of FIG. 9:

Player B (who has been identified as having a "FRIEND" relationship to Player A) may influence the outcomes of Player A's (Target Player's) game play events/activities both positively and negatively.

Player C (who has been identified as having an "FOF" relationship to Player A) may only have a positive influence the outcomes of Player A's (Target Player's) game play events/activities.

Player D (who has been identified as having a "Stranger" relationship to Player A) may not influence the outcomes of Player A's (Target Player's) game play events/activities either positively or negatively.

Example Game Play Scenario Illustrating Game Event Influence/Outcome Functionality An example game play scenario illustrating aspects of the game event influence/outcome functionality disclosed herein will now be described by way of example with reference to FIGS. 7-9 of the drawings. In this example, it is assumed that Player A comes across a treasure chest in his/her gaming experience. Player B (a "FRIEND" to Player A) and Player D (a "Stranger" to Player A) also arrive at the treasure chest at about the same time as Player A. In this example, it is assumed that Player D opens the treasure chest ahead of Player A and Player B, and takes the treasure. Accordingly, in Player D's gaming session (and as shown on Player D's screen), Player D is now shown to be in possession of the treasure. However, in at least one embodiment, the outcome of this event in Player A's gaming session and Player B's gaming session may be different than that of Player D.

For example, in at least one embodiment, the gaming server hosting the multi-player gaming session for Player A may automatically and/or dynamically identify (e.g., in real-time) Player D as having a "Stranger" relationship to Player A, and/or may automatically and/or dynamically determine (e.g., in real-time) that Player D may not influence the outcomes of Player A's (Target Player's) game play events/activities either positively or negatively. Accordingly, in at least one embodiment, in Player A's gaming session (and as shown on Player A's screen), the treasure chest may be displayed as not yet having been opened, and the treasure housed therein may still be up for grabs (e.g., by Player A or Player B).

Similarly, the gaming server hosting the multi-player gaming session for Player B may automatically and/or dynamically identify (e.g., in real-time) Player D as having a "FOF" relationship to Player B, and/or may automatically and/or dynamically determine (e.g., in real-time) that Player D may only have a positive influence the outcomes of Player B's game play events/activities. Accordingly, in at least one embodiment, since the taking of a treasure by Player D may represent a negative outcome from the perspective of Player B's gaming session, in Player B's gaming session (and as shown on Player B's screen), the treasure chest may be displayed as not yet having been opened, and the treasure housed therein may still be up for grabs (e.g., by Player A or Player B).

If, in this particular example, it is then assumed that Player B opens the chest and removes the treasure, the gaming server hosting the multi-player gaming session for Player A may automatically and/or dynamically determine (e.g., by referencing the Player Influence Matrix data of FIG. 9) that Player B may influence the outcomes of Player A's (Target Player's) game play events/activities both positively and negatively. Accordingly, in Player A's gaming session and Player B's gaming session, it may show Player B opening up the treasure chest and taking possession of the treasure inside the chest. However, in at least one embodiment, Player B's actions of opening up the treasure chest and taking the treasure they not be presented in Player D's gaming session since Player D had already opened up the treasure chest and taken possession of the treasure in his gaming session.

In at least one alternate embodiment (not shown) in which Player A allows other "Stranger" players to negatively affect game play outcomes of Player A's gaming session, and in which Player B does not allows other FOF players to negatively affect game play outcomes of Player B's gaming session, in Player B's gaming session (and as shown on Player B's screen), the treasure chest may be displayed as not yet having been opened, and the treasure housed therein may still be up for grabs, whereas, in Player A's gaming session (and as shown on Player B's screen), the game may show Player D opening up the treasure chest and taking possession of the treasure inside the chest.

Figure 10:
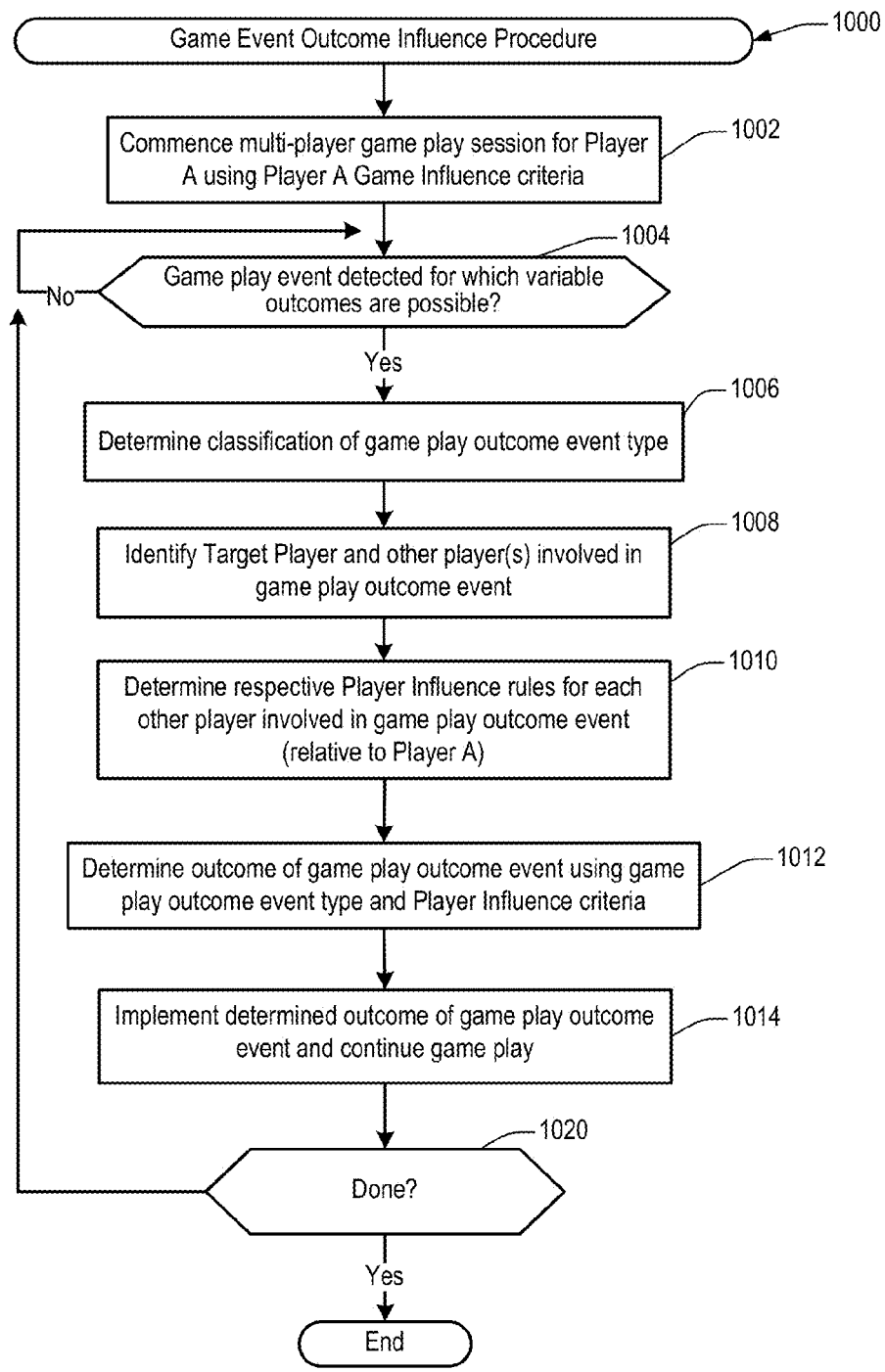
FIG. 10 shows an example of a Game Event Outcome Influence Procedure 1000 in accordance with a specific embodiment.

FIG. 10 shows an example of a Game Event Outcome Influence Procedure 1000 in accordance with a specific embodiment. As illustrated in the example embodiment of FIG. 10, the Game Event Outcome Influence Procedure 1000 may be operable to facilitate, initiate and/or perform one or more of the game event influence/outcome function(s), feature(s), and/or operations described and/or referenced herein.

According to different embodiments, at least a portion of the various types of functions, operations, actions, and/or other features provided by the Game Event Outcome Influence Procedure may be implemented at one or more client systems(s), at one or more server systems (s), and/or combinations thereof.

In at least one embodiment, the Game Event Outcome Influence Procedure may be operable to utilize and/or generate various different types of data and/or other types of information when performing specific tasks and/or operations. This may include, for example, input data/information and/or output data/information. For example, in at least one embodiment, the Game Event Outcome Influence Procedure may be operable to access, process, and/or otherwise utilize information from one or more different types of sources, such as, for example, one or more local and/or remote memories, devices and/or systems. Additionally, in at least one embodiment, the Game Event Outcome Influence Procedure may be operable to generate one or more different types of output data/information, which, for example, may be stored in memory of one or more local and/or remote devices and/or systems. Examples of different types of input data/information and/or output data/information which may be accessed and/or utilized by the Game Event Outcome Influence Procedure may include, but are not limited to, one or more of those described and/or referenced herein.

In at least one embodiment, a given instance of the Game Event Outcome Influence Procedure may access and/or utilize information from one or more associated databases. In at least one embodiment, at least a portion of the database information may be accessed via communication with one or more local and/or remote memory devices. Examples of different types of data which may be accessed by the Game Event Outcome Influence Procedure may include, but are not limited to, one or more of those described and/or referenced herein.

According to specific embodiments, multiple instances or threads of the Game Event Outcome Influence Procedure may be concurrently implemented and/or initiated via the use of one or more processors and/or other combinations of hardware and/or hardware and software. For example, in at least some embodiments, various aspects, features, and/or functionalities of the Game Event Outcome Influence Procedure may be performed, implemented and/or initiated by one or more of the various systems, components, systems, devices, procedures, processes, etc., described and/or referenced herein.

According to different embodiments, one or more different threads or instances of the Game Event Outcome Influence Procedure may be initiated in response to detection of one or more conditions or events satisfying one or more different types of minimum threshold criteria for triggering initiation of at least one instance of the Game Event Outcome Influence Procedure. Various examples of conditions or events which may trigger initiation and/or implementation of one or more different threads or instances of the Game Event Outcome Influence Procedure may include, but are not limited to, one or more of those described and/or referenced herein.

According to different embodiments, one or more different threads or instances of the Game Event Outcome Influence Procedure may be initiated and/or implemented manually, automatically, statically, dynamically, concurrently, and/or combinations thereof. Additionally, different instances and/or embodiments of the Game Event Outcome Influence Procedure may be initiated at one or more different time intervals (e.g., during a specific time interval, at regular periodic intervals, at irregular periodic intervals, upon demand, etc.).

In at least one embodiment, initial configuration of a given instance of the Game Event Outcome Influence Procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Game Event Outcome Influence Procedure may correspond to and/or may be derived from the input data/information.

For purposes of illustration, the Game Event Outcome Influence Procedure of FIG. 10 will now be described by way of example with reference to FIGS. 7-9 of the drawings. In at least one embodiment, separate threads or instances of the Game Event Outcome Influence Procedure may be in concurrently implemented and/or initiated for different gaming sessions associated with different players in the multi-player game. In the specific example embodiment of FIG. 10 it is assumed that multiple players (e.g., Player A-Player E) are participating in a multi-player game, and that the Game Event Outcome Influence Procedure has been configured or designed to facilitate management of event outcomes for the gaming session associated with Player A.

As shown at 1002, it is assumed that a multi-person game play session has been initiated for Player A using game event influence rules, data and/or criteria (e.g., as illustrated in FIGS. 7-9). In at least one embodiment, when a game play event has been detected (1004) for which a variable outcome is possible, the classification of the detected game play event type may be determined (1006). For example, in at least one embodiment, the classification of event type may be determined based upon whether or not the resulting outcome of the event is considered to be positive (e.g., where the outcome is beneficial to and/or advantageous to Player A), negative (e.g., where the outcome is harmful to and/or detrimental to Player A), or neutral from the perspective of Player A. Thus, for example, in one embodiment, the classification of event type may be determined to be either positive, negative, or neutral.

As shown at 1008, other player(s) who may be involved in the outcome of the detected game play event may be identified. In at least one embodiment, a respective relationship type may be identified between Player A and each of the other identified players (involved in the outcome of the detected game play event). In at least one embodiment, respective Player Influence rules may be determined (1010) for each (or selected) other player(s) involved in game play outcome event. In at least one embodiment, the Player Influence rules may be determined using the Player Influence Matrix data of FIG. 9.

As shown at 1012, using information relating to the game play event type and Player Influence rules, the outcome of the detected game play event for Player A's gaming session is determined, and implemented (1014) in Player A's gaming session.

Thereafter, the Player A's gaming session may continue, and the Game Event Outcome Influence Procedure may await detection of a next game play event in Player A's gaming session.

FIG. 1 illustrates a simplified block diagram of a specific example embodiment of a portion of a Gaming Network 100. As described in greater detail herein, different embodiments of computer networks may be configured, designed, and/or operable to provide various different types of operations, functionalities, and/or features generally relating to game event influence/outcome technology. Further, as described in greater detail herein, many of the various operations, functionalities, and/or features of the Gaming Network(s) disclosed herein may provide may enable or provide different types of advantages and/or benefits to different entities interacting with the Gaming Network(s).

Figure 6:
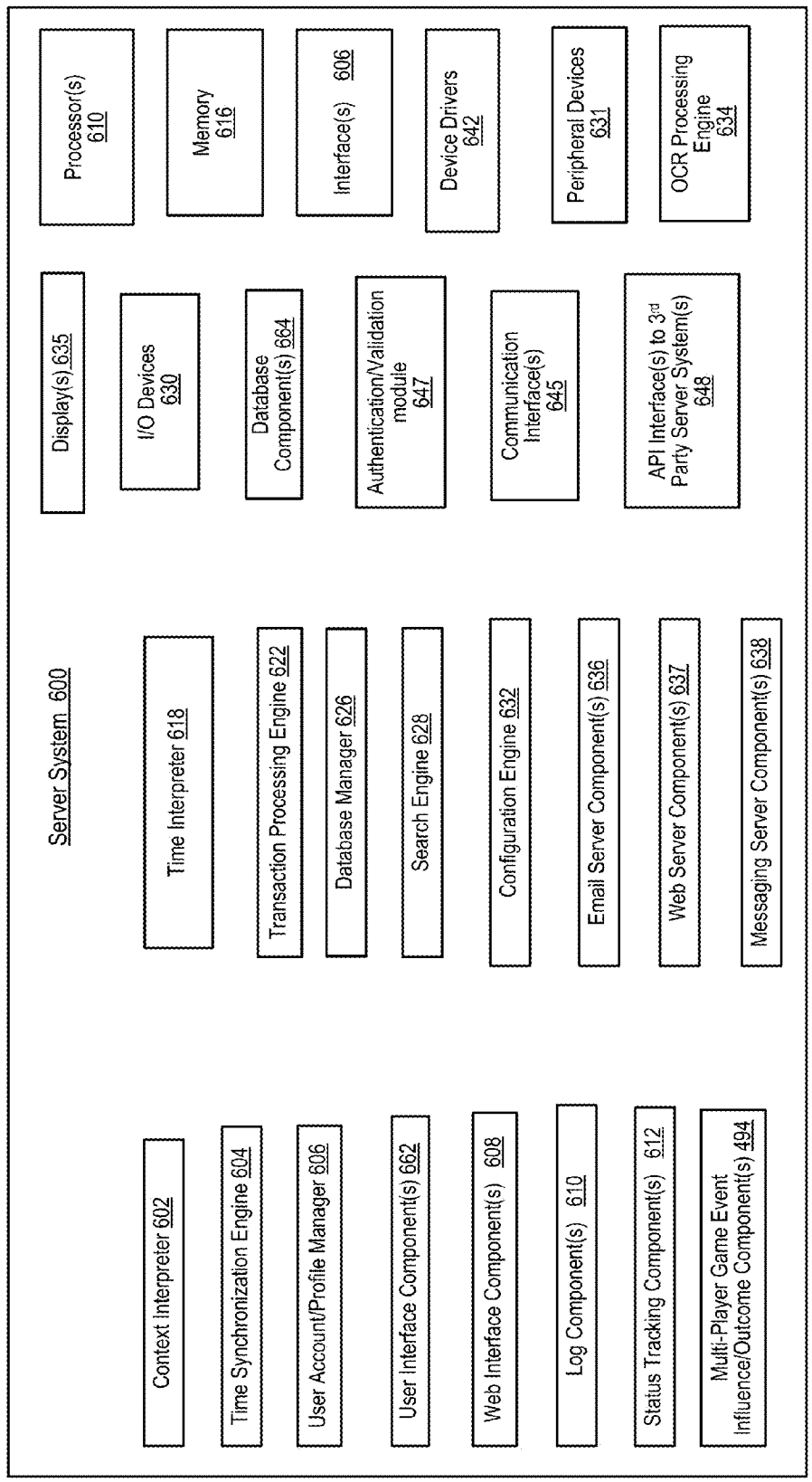
FIG. 6 illustrates an example of a functional block diagram of a Server System 600 in accordance with a specific embodiment.

According to different embodiments, the Gaming Network 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Gaming Network 100 may include one or more of the following types of systems, components, devices, processes, etc. (or combinations thereof):

- Server System(s) 120—In at least one embodiment, the Server System(s) may be operable to perform and/or implement various types of functions, operations, actions, and/or other features such as those described or referenced herein (e.g., such as those illustrated and/or described with respect to FIG. 6). In at least one embodiment, Server System 120 may be configured or designed to include Multi-Player Game Event Influence/Outcome Component(s) 194 for providing functionality relating to one or more of the game event influence/outcome aspects disclosed herein.
- Publisher/Content Provider System component(s) 140
- Client Computer System (s) 130
- 3$^{rd}$ Party System(s) 150
- Internet & Cellular Network(s) 110
- Remote Database System(s) 180
- Remote Server System(s)/Service(s) 170, which, for example, may include, but are not limited to, one or more of the following (or combinations thereof):
  - Content provider servers/services
  - Media Streaming servers/services
  - Database storage/access/query servers/services
  - Financial transaction servers/services
  - Payment gateway servers/services
  - Electronic commerce servers/services
  - Event management/scheduling servers/services
  - Etc.
- Mobile Device(s) 160, which, for example, may include, but are not limited to, one or more of the following (or combinations thereof): gaming machines, vending machines, televisions, kiosks, consumer devices, smart phones, video game consoles, personal computer systems, electronic display systems, etc. In at least one embodiment, the Mobile Device(s) may be operable to perform and/or implement various types of functions, operations, actions, and/or other features such as those described or referenced herein (e.g., such as those illustrated and/or described with respect to FIG. 4).
- etc.

In at least one embodiment, a Mobile Device may be operable to detect gross motion or gross movement of a user. For example, in one embodiment, a Mobile Device may include motion detection component(s) which may be operable to detect gross motion or gross movement of a user's body and/or appendages such as, for example, hands, fingers, arms, head, etc.

According to different embodiments, at least some Gaming Network(s) may be configured, designed, and/or operable to provide a number of different advantages and/or benefits and/or may be operable to initiate, and/or enable various different types of operations, functionalities, and/or features, such as, for example, one or more of those described or referenced herein.

According to different embodiments, at least a portion of the various types of functions, operations, actions, and/or other features provided by the Gaming Network 100 may be implemented at one or more client systems(s), at one or more server systems (s), and/or combinations thereof.

According to different embodiments, the Gaming Network may be operable to utilize and/or generate various different types of data and/or other types of information when performing specific tasks and/or operations. This may include, for example, input data/information and/or output data/information. For example, in at least one embodiment, the Gaming Network may be operable to access, process, and/or otherwise utilize information from one or more different types of sources, such as, for example, one or more local and/or remote memories, devices and/or systems. Additionally, in at least one embodiment, the Gaming Network may be operable to generate one or more different types of output data/information, which, for example, may be stored in memory of one or more local and/or remote devices and/or systems. Examples of different types of input data/information and/or output data/information which may be accessed and/or utilized by the Gaming Network may include, but are not limited to, one or more of those described and/or referenced herein.

According to specific embodiments, multiple instances or threads of the Gaming Network may be concurrently implemented and/or initiated via the use of one or more processors and/or other combinations of hardware and/or hardware and software. For example, in at least some embodiments, various aspects, features, and/or functionalities of the Gaming Network may be performed, implemented and/or initiated by one or more of the various systems, components, systems, devices, procedures, processes, etc., described and/or referenced herein.

In at least one embodiment, a given instance of the Gaming Network may access and/or utilize information from one or more associated databases. In at least one embodiment, at least a portion of the database information may be accessed via communication with one or more local and/or remote memory devices. Examples of different types of data which may be accessed by the Gaming Network may include, but are not limited to, one or more of those described and/or referenced herein.

According to different embodiments, one or more different threads or instances of the Gaming Network may be initiated in response to detection of one or more conditions or events satisfying one or more different types of minimum threshold criteria for triggering initiation of at least one instance of the Gaming Network. Various examples of conditions or events which may trigger initiation and/or implementation of one or more different threads or instances of the Gaming Network may include, but are not limited to, one or more of those described and/or referenced herein.

It will be appreciated that the Gaming Network of FIG. 1 is but one example from a wide range of Gaming Network embodiments which may be implemented. Other embodiments of the Gaming Network (not shown) may include additional, fewer and/or different components/features that those illustrated in the example Gaming Network embodiment of FIG. 1.

Generally, the game event influence/outcome techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the game event influence/outcome techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
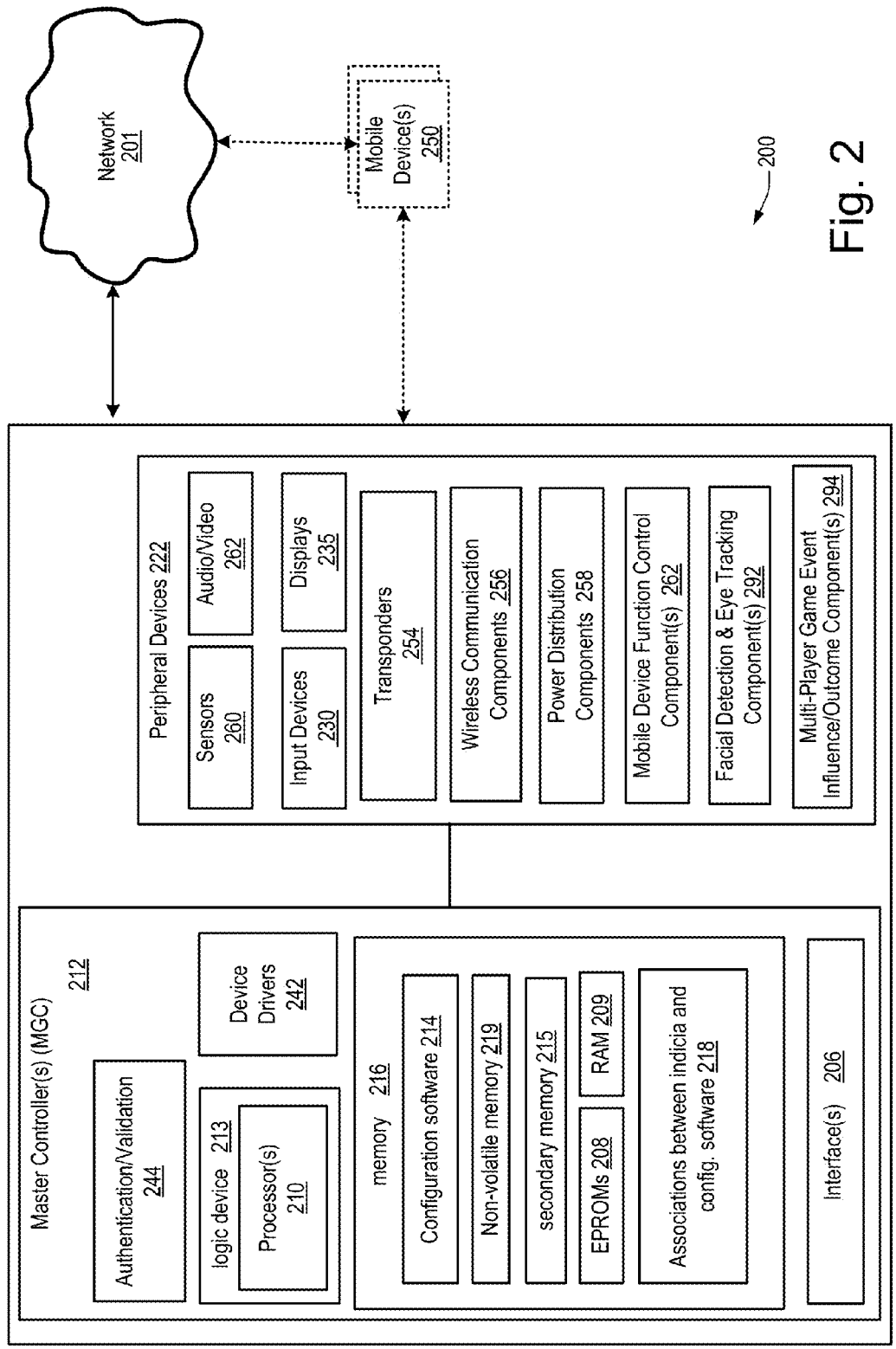
FIG. 2 is a simplified block diagram of an exemplary gaming machine 200 in accordance with a specific embodiment.

FIG. 2 is a simplified block diagram of an exemplary gaming machine 200 in accordance with a specific embodiment. As illustrated in the embodiment of FIG. 2, gaming machine 200 includes at least one processor 210, at least one interface 206, and memory 216.

In one implementation, processor 210 and master game controller 212 are included in a logic device 213 enclosed in a logic device housing. The processor 210 may include any conventional processor or logic device configured to execute software allowing various configuration and reconfiguration tasks such as, for example: a) communicating with a remote source via communication interface 206, such as a server that stores authentication information or games; b) converting signals read by an interface to a format corresponding to that used by software or memory in the gaming machine; c) accessing memory to configure or reconfigure game parameters in the memory according to indicia read from the device; d) communicating with interfaces, various peripheral devices 222 and/or I/O devices; e) operating peripheral devices 222 such as, for example, card readers, paper ticket readers, etc.; f) operating various I/O devices such as, for example, displays 235, input devices 230; etc. For instance, the processor 210 may send messages including game play information to the displays 235 to inform players of cards dealt, wagering information, and/or other desired information.

The gaming machine 200 also includes memory 216 which may include, for example, volatile memory (e.g., RAM 209), non-volatile memory 219 (e.g., disk memory, FLASH memory, EPROMs, etc.), unalterable memory (e.g., EPROMs 208), etc. The memory may be configured or designed to store, for example: 1) configuration software 214 such as all the parameters and settings for a game playable on the gaming machine; 2) associations 218 between configuration indicia read from a device with one or more parameters and settings; 3) communication protocols allowing the processor 210 to communicate with peripheral devices 222 and I/O devices 211; 4) a secondary memory storage device 215 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming machine to communicate with local and non-local devices using such protocols; etc. In one implementation, the master game controller 212 communicates using a serial communication protocol. A few examples of serial communication protocols that may be used to communicate with the master game controller include but are not limited to USB, RS-232 and Netplex (a proprietary protocol developed by IGT, Reno, Nev.).

A plurality of device drivers 242 may be stored in memory 216. Example of different types of device drivers may include device drivers for gaming machine components, device drivers for peripheral components 222, etc. Typically, the device drivers 242 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers include Netplex, USB, Serial, Ethernet 275, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 216 by the processor 210 to allow communication with the device. For instance, one type of card reader in gaming machine 200 may be replaced with a second type of card reader where device drivers for both card readers are stored in the memory 216.

In some embodiments, the software units stored in the memory 216 may be upgraded as needed. For instance, when the memory 216 is a hard drive, new games, game options, various new parameters, new settings for existing parameters, new settings for new parameters, device drivers, and new communication protocols may be uploaded to the memory from the master game controller 212 or from some other external device. As another example, when the memory 216 includes a CD/DVD drive including a CD/DVD designed or configured to store game options, parameters, and settings, the software stored in the memory may be upgraded by replacing a first CD/DVD with a second CD/DVD. In yet another example, when the memory 216 uses one or more flash memory 219 or EPROM 208 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming machine 200 may also include various authentication and/or validation components 244 which may be used for authenticating/validating specified gaming machine components such as, for example, hardware components, software components, firmware components, information stored in the gaming machine memory 216, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Peripheral devices 222 may include several device interfaces such as, for example: transponders 254, wire/wireless power distribution components 258, input device(s) 230, sensors 260, audio and/or video devices 262 (e.g., cameras, speakers, etc.), transponders 254, wireless communication components 256, wireless power components 258, mobile device function control components 262, side wagering management components 264, etc.

Sensors 260 may include, for example, optical sensors, pressure sensors, RF sensors, Infrared sensors, image sensors, thermal sensors, biometric sensors, etc. Such sensors may be used for a variety of functions such as, for example detecting the presence and/or identity of various persons (e.g., players, casino employees, etc.), devices (e.g., mobile devices), and/or systems within a predetermined proximity to the gaming machine. In one implementation, at least a portion of the sensors 260 and/or input devices 230 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming machine player displays and/or mobile device displays may include input functionality for allowing players to provide desired information (e.g., game play instructions and/or other input) to the gaming machine, game table and/or other gaming system components using the touch keys and/or other player control sensors/buttons. Additionally, such input functionality may also be used for allowing players to provide input to other devices in the casino gaming network (such as, for example, player tracking systems, side wagering systems, etc.)

Wireless communication components 256 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Power distribution components 258 may include, for example, components or devices which are operable for providing wired or wireless power to other devices. For example, in one implementation, the power distribution components 258 may include a magnetic induction system which is adapted to provide wireless power to one or more mobile devices near the gaming machine. In one implementation, a mobile device docking region may be provided which includes a power distribution component that is able to recharge a mobile device without requiring metal-to-metal contact.

In at least one embodiment, mobile device function control components 262 may be operable to control operating mode selection functionality, features, and/or components associated with one or more mobile devices (e.g., 250). In at least one embodiment, mobile device function control components 262 may be operable to remotely control and/or configure components of one or more mobile devices 250 based on various parameters and/or upon detection of specific events or conditions such as, for example: time of day, player activity levels; location of the mobile device; identity of mobile device user; user input; system override (e.g., emergency condition detected); proximity to other devices belonging to same group or association; proximity to specific objects, regions, zones, etc.

In at least one embodiment, side wagering management components 264 may be operable to manage side wagering activities associated with one or more side wager participants. Side wagering management components 264 may also be operable to manage or control side wagering functionality associated with one or more mobile devices 250. In accordance with at least one embodiment, side wagers may be associated with specific events in a wager-based game that is uncertain at the time the side wager is made. The events may also be associated with particular players, gaming devices (e.g., EGMs), game themes, bonuses, denominations, and/or paytables. In embodiments where the wager-based game is being played by multiple players, in one embodiment the side wagers may be made by participants who are not players of the game, and who are thus at least one level removed from the actual play of the game.

In instances where side wagers are made on events that depend at least in part on the skill of a particular player, it may be beneficial to provide observers (e.g., side wager participants) with information which is useful for determining whether a particular side wager should be placed, and/or for helping to determine the amount of such side wager. In at least one embodiment, side wagering management components 264 may be operable to manage and/or facilitate data access to player ratings, historical game play data, historical payout data, etc. For example, in one embodiment, a player rating for a player of the wager-based game may be computed based on historical data associated with past play of the wager-based game by that player in accordance with a pre-determined algorithms. The player rating for a particular player may be displayed to other players and/or observers, possibly at the option (or permission) of the player. By using player ratings in the consideration of making side wagers, decisions by observers to make side wagers on certain events need not be made completely at random. Player ratings may also be employed by the players themselves to aid them in determining potential opponents, for example.

Multi-Player Game Event Influence/Outcome Component(s) 294 may be configured or designed to facilitate and/or enable user controllable granularity in multi-player gaming environments for enabling a user (e.g., Target Player) to selectively allow/prevent game event influence/outcome by other players and/or groups of players participating in a multi-player game. According to different embodiments, the Multi-Player Game Event Influence/Outcome Component(s) may be configured or designed to include event influence/outcome functionality for facilitating user controllable granularity in multi-player gaming environments for enabling individual players of that game to granularly and selectively control the degree and/or type of influence other players of the game may have on game event outcomes relating to the game being played by that individual player.

In other embodiments (not shown) other peripheral devices include: player tracking devices, card readers, bill validator/paper ticket readers, etc. Such devices may each comprise resources for handling and processing configuration indicia such as a microcontroller that converts voltage levels for one or more scanning devices to signals provided to processor 210. In one embodiment, application software for interfacing with peripheral devices 222 may store instructions (such as, for example, how to read indicia from a portable device) in a memory device such as, for example, non-volatile memory, hard drive or a flash memory.

In at least one implementation, the gaming machine may include card readers such as used with credit cards, or other identification code reading devices to allow or require player identification in connection with play of the card game and associated recording of game action. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA™, MASTERCARD™, banks and/or other institutions.

The gaming machine may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's mobile device.

It will be apparent to those skilled in the art that other memory types, including various computer readable media, may be used for storing and executing program instructions pertaining to the operation EGMs described herein. Because such information and program instructions may be employed to implement the systems/methods described herein, example embodiments may relate to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Example embodiments may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Figure 3:
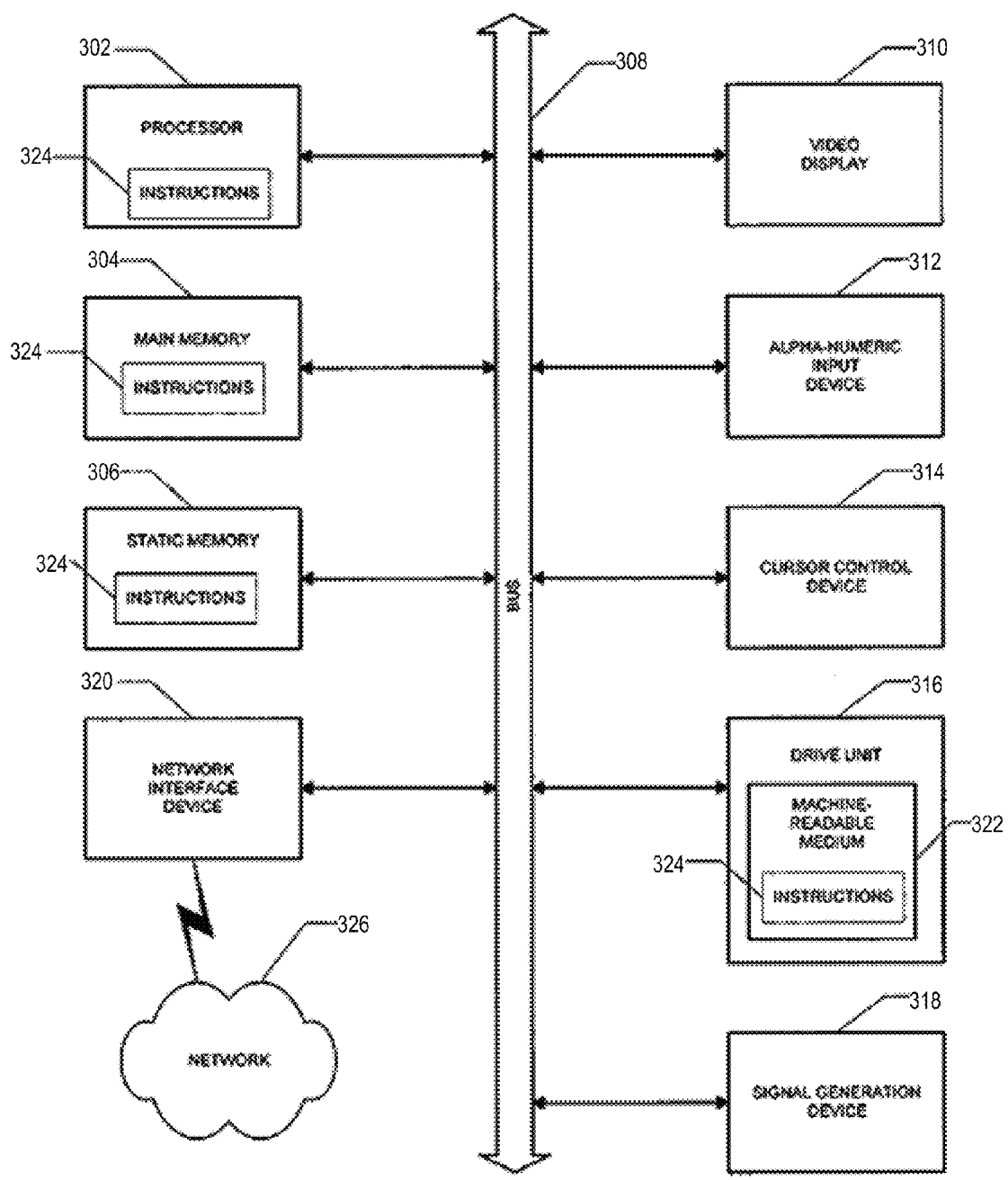
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

UI Components such as those illustrated, described, and/or referenced herein.

Database Components such as those illustrated, described, and/or referenced herein.

Processing Components such as those illustrated, described, and/or referenced herein.

Other Components which, for example, may include components for facilitating and/or enabling the Client Computer System to perform and/or initiate various types of operations, activities, functions such as those described herein.

In at least one embodiment, Client Computer System 300 may be configured or designed to include Multi-Player Game Event Influence/Outcome functionality for facilitating and/or enabling user controllable granularity in multi-player gaming environments for enabling a user (e.g., Target Player) to selectively allow/prevent game event influence/outcome by other players and/or groups of players participating in a multi-player game. According to different embodiments, the Multi-Player Game Event Influence/Outcome functionality may be configured or designed to facilitate and/or enable user controllable granularity in multi-player gaming environments for enabling individual players of that game to granularly and selectively control the degree and/or type of influence other players of the game may have on game event outcomes relating to the game being played by that individual player.

Figure 4:
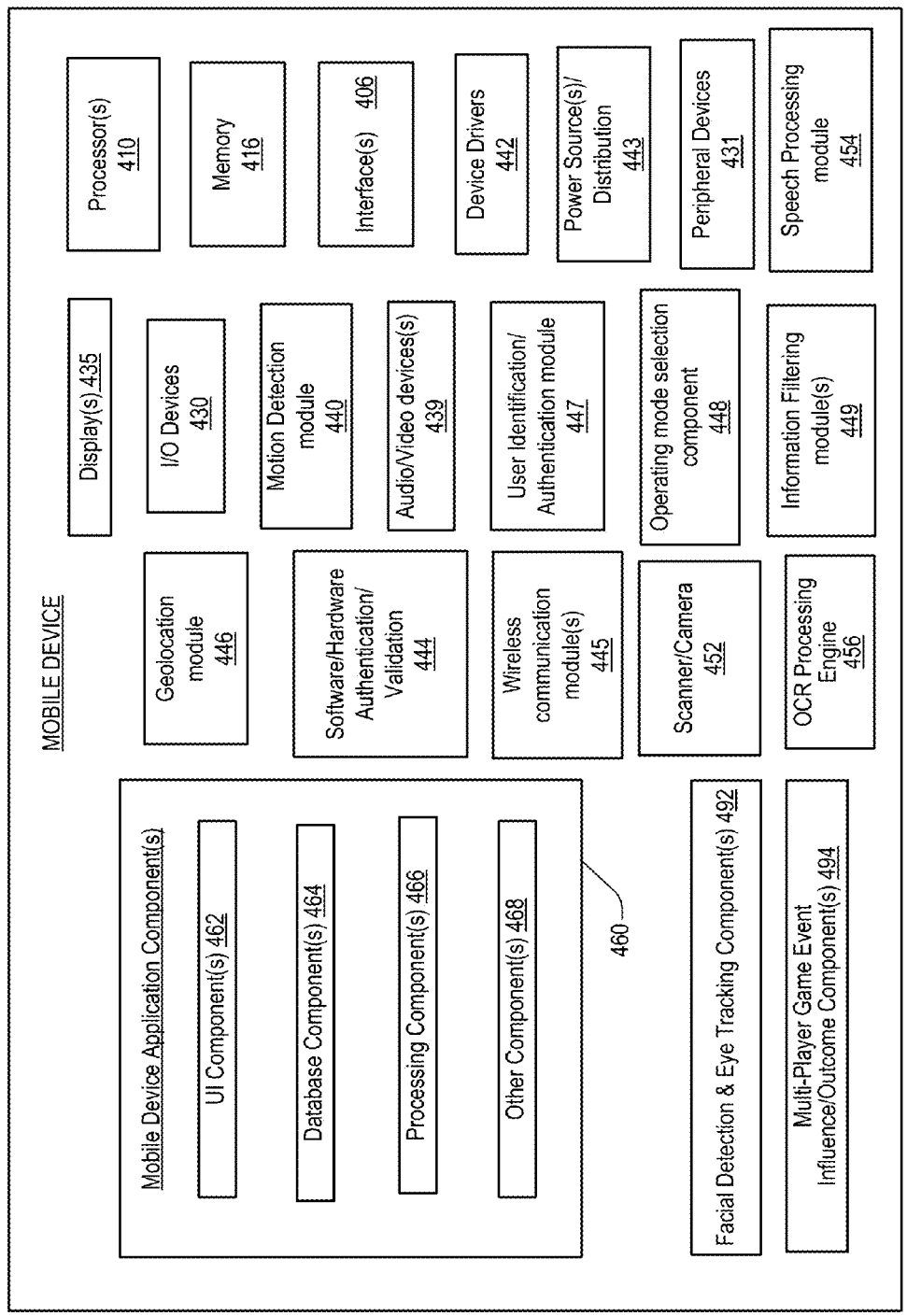
FIG. 4 is a simplified block diagram of an exemplary Mobile Device 400 in accordance with a specific embodiment.

FIG. 4 is a simplified block diagram of an exemplary Mobile Device 400 in accordance with a specific embodiment. In at least one embodiment, the Mobile Device may be configured or designed to include hardware components and/or hardware+software components for enabling or implementing at least a portion of the various game event influence/outcome techniques described and/or referenced herein.

According to specific embodiments, various aspects, features, and/or functionalities of the Mobile Device may be performed, implemented and/or initiated by one or more of the following types of systems, components, systems, devices, procedures, processes, etc. (or combinations thereof): Processor(s) 410; Device Drivers 442; Memory 416; Interface(s) 406; Power Source(s)/Distribution 443; Geolocation module 446; Display(s) 435; I/O Devices 430; Audio/Video devices(s) 439; Peripheral Devices 431; Motion Detection module 440; User Identification/Authentication module 447; Client App Component(s) 460; Other Component(s) 468; UI Component(s) 462; Database Component(s) 464; Processing Component(s) 466; Software/Hardware Authentication/Validation 444; Wireless communication module(s) 445; Information Filtering module(s) 449; Operating mode selection component 448; Speech Processing module 454; Scanner/Camera 452; OCR Processing Engine 456; Multi-Player Game Event Influence/Outcome Component(s) 492; etc.

As illustrated in the example of FIG. 4, Mobile Device 400 may include a variety of components, modules and/or systems for providing various types of functionality. For example, as illustrated in FIG. 4, Mobile Device 400 may include Mobile Device Application components (e.g., 460), which, for example, may include, but are not limited to, one or more of the following (or combinations thereof):

UI Components 462 such as those illustrated, described, and/or referenced herein.

Database Components 464 such as those illustrated, described, and/or referenced herein.

Processing Components 466 such as those illustrated, described, and/or referenced herein.

Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described and/or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more of the various systems, components, systems, devices, procedures, processes, etc., described and/or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described and/or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described and/or referenced herein.

According to different embodiments, Mobile Device 400 may further include, but is not limited to, one or more of the following types of components, modules and/or systems (or combinations thereof):

At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various game event influence/outcome techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the game event influence/outcome techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as flopti-cal disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 442. In at least one implementation, the device driver(s) 442 may include functionality similar to at least a portion of functionality implemented by one or more computer system driver devices such as those described herein and/or generally known to one having ordinary skill in the art.

At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

Geolocation module 446 which, for example, may be configured or designed to acquire geolocation information from remote sources and use the acquired geolocation information to determine information relating to a relative and/or absolute position of the client system.

Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that can detect the acceleration and/or other movements of the client system as it is moved by a user.

User Identification/Authentication module 447. In one implementation, the User Identification module may be adapted to determine and/or authenticate the identity of the current user or owner of the client system. For example, in one embodiment, the current Functionality for enabling a user to be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example: PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Multi-Player Game Event Influence/Outcome Component(s) 494 which may be configured or designed to facilitate and/or enable user controllable granularity in multi-player gaming environments for enabling a user (e.g., Target Player) to selectively allow/prevent game event influence/outcome by other players and/or groups of players participating in a multi-player game. According to different embodiments, the Multi-Player Game Event Influence/Outcome Component(s) may be configured or designed to include event influence/outcome functionality for facilitating user controllable granularity in multi-player gaming environments for enabling individual players of that game to granularly and selectively control the degree and/or type of influence other players of the game may have on game event outcomes relating to the game being played by that individual player.

Etc.

According to a specific embodiment, the Mobile Device may be adapted to implement at least a portion of the features associated with the mobile game service system described in U.S. patent application Ser. No. 10/115,164, which is now U.S. Pat. No. 6,800,029, issued Oct. 5, 2004, (previously incorporated by reference in its entirety). For example. in one embodiment, the Mobile Device may be comprised of a handheld game service user interface device (GSUID) and a number of input and output devices. The GSUID is generally comprised of a display screen which may display a number of game service interfaces. These game service interfaces are generated on the display screen by a microprocessor of some type within the GSUID. Examples of a hand-held GSUID which may accommodate the game service interfaces are manufactured by Symbol Technologies, Incorporated of Holtsville, N.Y.

The game service interfaces may be used to provide a variety of game service transactions and gaming operations services. The game service interfaces, including a login interface, an input/output interface, a transaction reconciliation interface, a ticket validation interface, a prize services interfaces, a food services interface, an accommodation services interfaces, a gaming operations interfaces, a multi-game/multi-denomination meter data transfer interface, etc. Each interface may be accessed via a main menu with a number of sub-menus that allow a game service representative to access the different display screens relating to the particular interface. Using the different display screens within a particular interface, the game service representative may perform various operations needed to provide a particular game service. For example, the login interface may allow the game service representative to enter a user identification of some type and verify the user identification with a password. When the display screen is a touch screen, the user may enter the user/operator identification information on a display screen comprising the login interface using the input stylus and/or using the input buttons. Using a menu on the display screen of the login interface, the user may select other display screens relating to the login and registration process. For example, another display screen obtained via a menu on a display screen in the login interface may allow the GSUID to scan a finger print of the game service representative for identification purposes or scan the finger print of a game player.

The user identification information and user validation information may allow the game service representative to access all or some subset of the available game service interfaces available on the GSUID. For example, certain users, after logging into the GSUID (e.g. entering a user identification and a valid user identification information), may be able to access a variety of different interfaces, such as, for example, one or more of: input/output interface, communication interface, food services interface, accommodation services interface, prize service interface, gaming operation services interface, transaction reconciliation interface, voice communication interface, gaming device performance or metering data transfer interface, etc.; and perform a variety of services enabled by such interfaces. While other users may be only be able to access the award ticket validation interface and perform EZ pay ticket validations. The GSUID may also output game service transaction information to a number of different devices (e.g., card reader, printer, storage devices, gaming machines and remote transaction servers, etc.).

In addition to the features described above, various embodiments of mobile devices described herein may also include additional functionality for displaying, in real-time, filtered information to the user based upon a variety of criteria such as, for example, geolocation information, casino data information, player tracking information, etc.

Figure 5:
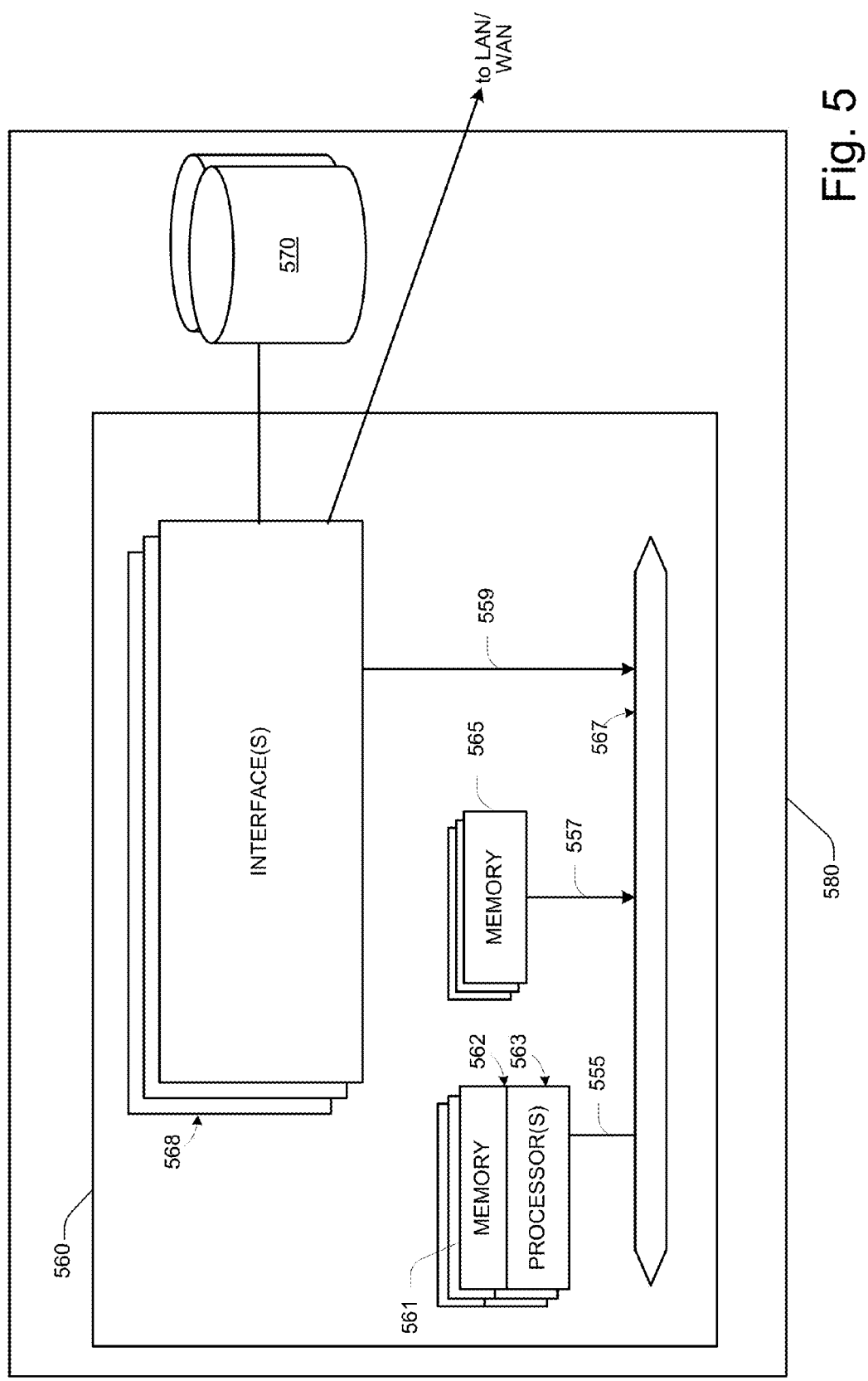
FIG. 5 illustrates an example embodiment of a Server System 580 which may be used for implementing various aspects/features described herein.

FIG. 5 illustrates an example embodiment of a Server System 580 which may be used for implementing various aspects/features described herein. In at least one embodiment, the Server System 580 includes at least one network device 560, and at least one storage device 570 (such as, for example, a direct attached storage device). In one embodiment, Server System 580 may be suitable for implementing at least some of the game event influence/outcome techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic™ software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of Server System 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the Server System 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the Server System 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various game event influence/outcome techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a Server System 600 in accordance with a specific embodiment. In at least one embodiment, the Server System 600 may be operable to perform and/or implement various types of functions, operations, actions, and/or other features such, for example, one or more of those illustrated, described, and/or referenced herein.

In at least one embodiment, the Server System may include a plurality of components operable to perform and/or implement various types of functions, operations, actions, and/or other features such as, for example, one or more of the following (or combinations thereof):

Context Interpreter (e.g., 602) which, for example, may be operable to automatically and/or dynamically analyze contextual criteria relating to one or more detected event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof): location-based criteria (e.g., geolocation of client device, geolocation of agent device, etc.); time-based criteria; identity of Client user; identity of Agent user; user profile information; transaction history information; recent user activities; proximate business-related criteria (e.g., criteria which may be used to determine whether the client device is currently located at or near a recognized business establishment such as a bank, gas station, restaurant, supermarket, etc.); etc.

Time Synchronization Engine (e.g., 604) which, for example, may be operable to manages universal time synchronization (e.g., via NTP and/or GPS)

Search Engine (e.g., 628) which, for example, may be operable to search for transactions, logs, items, accounts, options in the TIS databases Configuration Engine (e.g., 632) which, for example, may be operable to determine and handle configuration of various customized configuration parameters for one or more devices, component(s), system(s), process(es), etc.

Time Interpreter (e.g., 618) which, for example, may be operable to automatically and/or dynamically modify or change identifier activation and expiration time(s) based on various criteria such as, for example, time, location, transaction status, etc.

Authentication/Validation Component(s) (e.g., 647) (password, software/hardware info, SSL certificates) which, for example, may be operable to perform various types of authentication/validation tasks such as, for example, one or more of the following (or combinations thereof): verifying/authenticating devices, verifying passwords, passcodes, SSL certificates, biometric identification information, and/or other types of security-related information; verify/validate activation and/or expiration times; etc. In one implementation, the Authentication/Validation Component(s) may be adapted to determine and/or authenticate the identity of the current user or owner of the mobile client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The user's biometric information (e.g., fingerprints, face, voice, eye/iris, etc.). In at least one implementation, various security features may be incorporated into the mobile client system to prevent unauthorized users from accessing confidential or sensitive information.

Transaction Processing Engine (e.g., 622) which, for example, may be operable to handle various types of transaction processing tasks such as, for example, one or more of the following (or combinations thereof): identifying/determining transaction type; determining which payment gateway(s) to use; associating databases information to identifiers; etc.

OCR Processing Engine (e.g., 634) which, for example, may be operable to perform image processing and optical character recognition of images such as those captured by a mobile device camera, for example.

Database Manager (e.g., 626) which, for example, may be operable to handle various types of tasks relating to database updating, database management, database access, etc. In at least one embodiment, the Database Manager may be operable to manage TISS databases, Gaming Device Application databases, etc.

Log Component(s) (e.g., 610) which, for example, may be operable to generate and manage transactions history logs, system errors, connections from APIs, etc.

Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.

Gateway Component(s) (e.g., 614) which, for example, may be operable to facilitate and manage communications and transactions with external Payment Gateways.

Web Interface Component(s) (e.g., 608) which, for example, may be operable to facilitate and manage communications and transactions with TIS web portal(s).

API Interface(s) to Server System(s) (e.g., 646) which, for example, may be operable to facilitate and manage communications and transactions with API Interface(s) to Server System(s)

API Interface(s) to 3rd Party Server System(s) (e.g., 648) which, for example, may be operable to facilitate and manage communications and transactions with API Interface(s) to 3rd Party Server System(s)

OCR Processing Engine (e.g., 634) which, for example, may be operable to perform image processing and optical character recognition of images such as those captured by a mobile device camera, for example.

At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the Gaming Network techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.

Device driver(s) 642. In at least one implementation, the device driver(s) 642 may include functionality similar to at least a portion of functionality implemented by one or more computer system driver devices such as those described herein and/or generally known to one having ordinary skill in the art.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.

Email Server Component(s) 636, which, for example, may be configured or designed to provide various functions and operations relating to email activities and communications.

Web Server Component(s) 637, which, for example, may be configured or designed to provide various functions and operations relating to web server activities and communications.

Messaging Server Component(s) 638, which, for example, may be configured or designed to provide various functions and operations relating to text messaging and/or other social network messaging activities and/or communications.

Multi-Player Game Event Influence/Outcome Component(s) 694 which may be configured or designed to facilitate and/or enable user controllable granularity in multi-player gaming environments for enabling a user (e.g., Target Player) to selectively allow/prevent game event influence/outcome by other players and/or groups of players participating in a multi-player game. According to different embodiments, the Multi-Player Game Event Influence/Outcome Component(s) may be configured or designed to include event influence/outcome functionality for facilitating user controllable granularity in multi-player gaming environments for enabling individual players of that game to granularly and selectively control the degree and/or type of influence other players of the game may have on game event outcomes relating to the game being played by that individual player.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A gaming system in a gaming network, comprising:
   a gaming controller;
   a memory storing a plurality of instructions;
   a first display;
   at least one interface for communicating with at least one other device in the gaming network;
   wherein when the gaming controller executes the plurality of instructions stored in the memory, the gaming controller operates with the first display and the at least one interface to:
   control a first gaming session;
   enable a first player to participate in the first gaming session;
   enable the first player to selectively customize a level or degree of influence that a first group of selected other players has over outcomes of a first set of game-related events and activities relating to the first gaming session;
   enable the first player to selectively identify the first group of selected other players;
   enable the first player to selectively identify the first set of game-related events and activities;
   wherein the first group of selected other players is selected from a set of groups consisting of: a group comprising friends of the first player; a group comprising friends of friends of the first player (FOF); a group comprising friends of FOF; a group comprising strangers; a group comprising at least one other player identified by the first player; and a group comprising at least one other player which match specific selection criteria; and
   wherein the first set of game-related events and activities is selected from a set of groups consisting of: events or activities relating to the awarding of and/or loss of game points; events or activities relating to the awarding of and/or loss of game-related life/health points; events or activities relating to the awarding of and/or loss of game-related bonuses; events or activities relating to the awarding of and/or loss of real and/or virtual currency; events or activities relating to the awarding of, loss of, and/or possession of game-related virtual objects; events or activities relating to the awarding of and/or loss of game-related rank and/or status; events or activities relating to the awarding of, loss of, and/or possession of game-related virtual real estate; events or activities relating to the reconfiguration, improvement and/or alteration of game-related characters, object, assets or real-estate; and events or activities relating to the awarding of, loss of, possession of, and/or access to game-related character attributes; events or activities relating to the awarding of, loss of, possession of, and/or access to specialized game-related powers or abilities.

2. The gaming system of claim 1 being further operable to:
   enable the first player to selectively identify the first group of selected other players.

3. The gaming system of claim 1 being further operable to:
   enable the first player to selectively identify the first set of game-related events and activities.

4. The gaming system of claim 1 being further operable to:
   enable the first player to selectively customize a level or degree of influence that a second group of selected other players has over outcomes of a second set of game-related events and activities relating to the first gaming session;
wherein the first group of selected other players is different from the second group of selected other players; and
wherein the first set of game-related events and activities is different from the second set of game-related events and activities.

5. The gaming system of claim 1 being further operable to:
enable the first player to selectively customize a level or degree of influence that a first group of selected other players has over outcomes of a first set of game-related events and activities relating to the first gaming session by designating that the first group of selected other players is permitted to influence the outcomes of the first set of game-related events and activities relating to the first gaming session.

6. The gaming system of claim 1 being further operable to:
enable the first player to selectively customize a level or degree of influence that a first group of selected other players has over outcomes of a first set of game-related events and activities relating to the first gaming session by designating that the first group of selected other players is permitted to only influence the outcomes of the first set of game-related events and activities relating to the first gaming session.

7. The gaming system of claim 1 being further operable to:
enable the first player to selectively customize a level or degree of influence that a first group of selected other players has over outcomes of a first set of game-related events and activities relating to the first gaming session by designating that the first group of selected other players is not permitted to influence the outcomes of the first set of game-related events and activities relating to the first gaming session.

8. The gaming system of claim 1 being further operable to:
enable the first player to selectively customize a level or degree of influence that a first group of selected other players has over outcomes of a first set of game-related events and activities relating to the first gaming session by designating that the first group of selected other players is only permitted to positively influence the outcomes of the first set of game-related events and activities relating to the first gaming session in a manner which is beneficial to and/or advantageous to the first player.

9. The gaming system of claim 1 being further operable to:
enable the first player to selectively customize a level or degree of influence that a first group of selected other players has over outcomes of a first set of game-related events and activities relating to the first gaming session by designating that the first group of selected other players is only permitted to negatively influence the outcomes of the first set of game-related events and activities relating to the first gaming session in a manner which is harmful to and/or detrimental to the first player.

10. The gaming system of claim 1 being further operable to:
enable the first player to selectively customize a level or degree of influence that a first group of selected other players has over outcomes of a first set of game-related events and activities relating to the first gaming session by designating that the first group of selected other players is prohibited from negatively influencing the outcomes of the first set of game-related events and activities relating to the first gaming session in a manner which is harmful to and/or detrimental to the first player.

11. The gaming system of claim 1 wherein the first gaming session relates to a network-based multi-player game.

12. The gaming system of claim 1 wherein the first gaming session relates to a multi-player wager-based game.

13. A computer implemented method for operating a gaming device in a gaming network, the method comprising:
causing a gaming controller to execute a plurality of instructions, which are stored in a memory device, to control a first gaming session;
enabling a first player to participate in the first gaming session;
enabling the first player to selectively customize a level or degree of influence that a first group of selected other players has over outcomes of a first set of game-related events and activities relating to the first gaming session;
enabling the first player to selectively identify the first group of selected other players;
enabling the first player to selectively identify the first set of game-related events and activities;
wherein the first group of selected other players is selected from a set of groups consisting of: a group comprising friends of the first player; a group comprising friends of friends of the first player (FOF); a group comprising friends of FOF; a group comprising strangers; a group comprising at least one other player identified by the first player; and a group comprising at least one other player which match specific selection criteria; and
wherein the first set of game-related events and activities is selected from a set of groups consisting of: events or activities relating to the awarding of and/or loss of game points; events or activities relating to the awarding of and/or loss of game-related life/health points; events or activities relating to the awarding of and/or loss of game-related bonuses; events or activities relating to the awarding of and/or loss of real and/or virtual currency; events or activities relating to the awarding of, loss of, and/or possession of game-related virtual objects; events or activities relating to the awarding of and/or loss of game-related rank and/or status; events or activities relating to the awarding of, loss of, and/or possession of game-related virtual real estate; events or activities relating to the reconfiguration, improvement and/or alteration of game-related characters, object, assets or real-estate; and events or activities relating to the awarding of, loss of, possession of, and/or access to game-related character attributes; events or activities relating to the awarding of, loss of, possession of, and/or access to specialized game-related powers or abilities.

14. The method of claim 13 further comprising:
enabling the first player to selectively identifying the first group of selected other players.

15. The method of claim 13 further comprising:
enabling the first player to selectively identifying the first set of game-related events and activities.

16. The method of claim 13 further comprising:
enabling the first player to selectively customize a level or degree of influence that a second group of selected other players has over outcomes of a second set of game-related events and activities relating to the first gaming session;
wherein the first group of selected other players is different from the second group of selected other players; and
wherein the first set of game-related events and activities is different from the second set of game-related events and activities.

17. The method of claim 13 further comprising:
enabling the first player to selectively customize a level or degree of influence that a first group of selected other players has over outcomes of a first set of game-related events and activities relating to the first gaming session by designating that the first group of selected other players is permitted to influence the outcomes of the first set of game-related events and activities relating to the first gaming session.

18. The method of claim 13 further comprising:
enabling the first player to selectively customize a level or degree of influence that a first group of selected other players has over outcomes of a first set of game-related events and activities relating to the first gaming session by designating that the first group of selected other players is permitted to only influence the outcomes of the first set of game-related events and activities relating to the first gaming session.

19. The method of claim 13 further comprising:
enabling the first player to selectively customize a level or degree of influence that a first group of selected other players has over outcomes of a first set of game-related events and activities relating to the first gaming session by designating that the first group of selected other players is not permitted to influence the outcomes of the first set of game-related events and activities relating to the first gaming session.

20. The method of claim 13 further comprising:
enabling the first player to selectively customize a level or degree of influence that a first group of selected other players has over outcomes of a first set of game-related events and activities relating to the first gaming session by designating that the first group of selected other players is only permitted to positively influence the outcomes of the first set of game-related events and activities relating to the first gaming session in a manner which is beneficial to and/or advantageous to the first player.

21. The method of claim 13 further comprising:
enabling the first player to selectively customize a level or degree of influence that a first group of selected other players has over outcomes of a first set of game-related events and activities relating to the first gaming session by designating that the first group of selected other players is only permitted to negatively influence the outcomes of the first set of game-related events and activities relating to the first gaming session in a manner which is harmful to and/or detrimental to the first player.

22. The method of claim 13 further comprising:
enabling the first player to selectively customize a level or degree of influence that a first group of selected other players has over outcomes of a first set of game-related events and activities relating to the first gaming session by designating that the first group of selected other players is prohibited from negatively influencing the outcomes of the first set of game-related events and activities relating to the first gaming session in a manner which is harmful to and/or detrimental to the first player.

23. A computer implemented computer program product for operating a gaming device in a gaming network, the computer program product comprising:
a computer usable medium having computer readable code embodied therein, the computer readable code comprising:
computer code, which when executed by a processor, causes a gaming controller to execute a plurality of instructions, which are stored in a memory device, to control a first gaming session;
computer code, which when executed by the processor, enables a first player to participate in the first gaming session;
computer code, which when executed by the processor, enables the first player to selectively customize a level or degree of influence that a first group of selected other players has over outcomes of a first set of game-related events and activities relating to the first gaming session;
computer code, which when executed by the processor, enables the first player to selectively identify the first group of selected other players;
computer code, which when executed by the processor, enables the first player to selectively identify the first set of game-related events and activities;
wherein the first group of selected other players is selected from a set of groups consisting of: a group comprising friends of the first player; a group comprising friends of friends of the first player (FOF); a group comprising friends of FOF; a group comprising strangers; a group comprising at least one other player identified by the first player; and a group comprising at least one other player which match specific selection criteria; and
wherein the first set of game-related events and activities is selected from a set of groups consisting of: events or activities relating to the awarding of and/or loss of game points; events or activities relating to the awarding of and/or loss of game-related life/health points; events or activities relating to the awarding of and/or loss of game-related bonuses; events or activities relating to the awarding of and/or loss of real and/or virtual currency; events or activities relating to the awarding of, loss of, and/or possession of game-related virtual objects; events or activities relating to the awarding of and/or loss of game-related rank and/or status; events or activities relating to the awarding of, loss of, and/or possession of game-related virtual real estate; events or activities relating to the reconfiguration, improvement and/or alteration of game-related characters, object, assets or real-estate; and events or activities relating to the awarding of, loss of, possession of, and/or access to game-related character attributes; events or activities relating to the awarding of, loss of, possession of, and/or access to specialized game-related powers or abilities.

24. A computer implemented system for operating a gaming device in a gaming network, the system comprising:
means for causing a gaming controller to execute a plurality of instructions, which are stored in a memory device, to control a first gaming session;
means for enabling a first player to participate in the first gaming session;
means for enabling the first player to selectively customize a level or degree of influence that a first group of selected other players has over outcomes of a first set of game-related events and activities relating to the first gaming session;
means for enabling the first player to selectively identify the first group of selected other players;
means for enabling the first player to selectively identify the first set of game-related events and activities;
wherein the first group of selected other players is selected from a set of groups consisting of: a group comprising friends of the first player; a group comprising friends of friends of the first player (FOF); a group comprising friends of FOF; a group comprising strangers; a group comprising at least one other player identified by the first player; and a group comprising at least one other player which match specific selection criteria; and wherein the first set of game-related events and activities is selected from a set of groups consisting of: events or activities relating to the awarding of and/or loss of game points; events or activities relating to the awarding of and/or loss of game-related life/health points; events or activities relating to the awarding of and/or loss of game-related bonuses; events or activities relating to the awarding of and/or loss of real and/or virtual currency; events or activities relating to the awarding of, loss of, and/or possession of game-related virtual objects; events or activities relating to the awarding of and/or loss of game-related rank and/or status; events or activities relating to the awarding of, loss of, and/or possession of game-related virtual real estate; events or activities relating to the reconfiguration, improvement and/or alteration of game-related characters, object, assets or real-estate; and events or activities relating to the awarding of, loss of, possession of, and/or access to game-related character attributes; events or activities relating to the awarding of, loss of, possession of, and/or access to specialized game-related powers or abilities.

\* \* \* \* \*